United States Patent
Okano

(10) Patent No.: US 6,839,844 B1
(45) Date of Patent: Jan. 4, 2005

(54) IMAGE ENCRYPTION METHOD AND DEVICE

(75) Inventor: Hirokazu Okano, 1-8-6, Kurakake, Asakita-ku, Hiroshima-shi, Hiroshima (JP)

(73) Assignees: Hirokazu Okano, Hiroshima (JP); Sachiko Okano, Hiroshima (JP); Junko Okano, Osaka (JP); Makoto Okano, Hiroshima (JP); Masayuki Okano, Hiroshima (JP)

(*) Notice: Subject to any disclaimer, the term of this patent is extended or adjusted under 35 U.S.C. 154(b) by 0 days.

(21) Appl. No.: 09/489,273

(22) Filed: Jan. 21, 2000

(30) Foreign Application Priority Data

Jan. 3, 2000 (JP) .................................. 2000-100118

(51) Int. Cl.[7] .............................. H04L 9/00; H04N 1/44
(52) U.S. Cl. ........................................ 713/176; 380/246
(58) Field of Search ................................ 380/243, 246, 380/269, 54; 382/100; 713/176, 181, 180, 179

(56) References Cited

U.S. PATENT DOCUMENTS

| | | | | |
|---|---|---|---|---|
| 5,398,283 A | * | 3/1995 | Virga | 380/243 |
| 5,504,818 A | * | 4/1996 | Okano | 713/166 |
| 5,687,236 A | * | 11/1997 | Moskowitz et al. | 380/28 |
| 5,748,783 A | * | 5/1998 | Rhoads | 382/232 |
| 5,765,152 A | * | 6/1998 | Erickson | 707/9 |
| 5,848,155 A | * | 12/1998 | Cox | 382/191 |
| 5,903,646 A | * | 5/1999 | Rackman | 705/51 |
| 6,108,434 A | * | 8/2000 | Cox et al. | 382/100 |
| 6,178,243 B1 | * | 1/2001 | Pomerantz et al. | 380/243 |
| 6,311,246 B1 | * | 10/2001 | Wegner et al. | 710/305 |
| 6,345,104 B1 | * | 2/2002 | Rhoads | 382/100 |
| 6,381,331 B1 | * | 4/2002 | Kato | 380/37 |
| 6,411,725 B1 | * | 6/2002 | Rhoads | 382/100 |
| 6,442,285 B2 | * | 8/2002 | Rhoads et al. | 382/100 |
| 6,456,726 B1 | * | 9/2002 | Yu et al. | 382/100 |
| 2002/0106103 A1 | * | 8/2002 | Jones et al. | 382/100 |
| 2003/0193602 A1 | * | 10/2003 | Satoh et al. | 348/333.12 |

OTHER PUBLICATIONS

Gruhl, D. et al., Information Hiding to Foil the Casual Counterfeiter, Information Hiding, 1–15 (1998).*
Wokuruk, W., Corpus Based Evaluation of Entropy Rate Speech Segmentation, University of Stuttgert, Germany.*
Yu et al. Multilevel Data Hiding for Digital for Digital Image and Video, 10–21.*

* cited by examiner

Primary Examiner—Norman M. Wright
Assistant Examiner—Michael J Simitoski
(74) Attorney, Agent, or Firm—Koda & Androlia

(57) ABSTRACT

A portion of an image is selected as an arbitrary rectangle indicated by diagonal coordinates, and this portion of an image is encrypted and embedded in the original rectangular image portion, thus accomplishing partial encryption of the image. This is done by an image encryption device, in which an partial image data selector, encryptor and decryptor are connected via a memory; and a display, auxiliary (external) memory, keyboard, mouse, image scanner, camera, etc. are also connected. At the time of decryption, the encrypted rectangle is decrypted and returned to its original state.

9 Claims, 4 Drawing Sheets

IMAGE ENCRYPTION METHOD AND DEVICE

BACKGROUND OF THE INVENTION

1. Field of the Invention

The present invention relates to an image encryption method and device for partially encrypting images

2. Prior Art

Encryption/decryption conversions are accomplished by means of an encryption algorithm which is controlled by an encryption key. Encryption techniques are described in detail in "Ango to Joho Security ("Cryptographs and Information Security)" written by Tsujii and Kasahara and published in March, 1990 by Shokodo, a publishing company.

A typical cryptograph is described in U.S. Pat. No. 3,958,081 issued on May 18, 1976. This cryptograph is called DES (see "Data Encryption Standard", FIPS IMAGE ENCRYPTION METHOD AND DEVICE PUB, NBS January, 1977). In this DES (data encryption standard) cipher, the encryption is done by 64-bit unit.

The above-described encryption is called a symmetrical block cryptograph; and in contrast to this, there exist asymmetrical public-key cryptographs. Typical RSA (Rivest, Shamir, and Adleman) cipher is described in "A Method for Obtaining Digital Signatures and Public-Key Cryptosystems", a publication called "Communications of the ACM", Vol. 21, No. 2, pp. 120–126, (1978) as a public-key cryptograph.

These techniques are superior, and the present invention is based on these techniques. However, the present invention is not limited to the use of these techniques alone; and various encryption techniques including these techniques can be used in the present invention.

Furthermore, in Japanese Patent Application Laid-Open (Kokai) No. S63-212276, titled "Facsimile Device", a facsimile device is described. In this facsimile device, important portions of the image on the original paper to be transmitted are encrypted, while the remaining portions of the image are transmitted "as it is". In this system, a portion of the image data on the original paper is designated by a marker and is encrypted at the time of data transmission. Then, partially encrypted dots are outputted in the original plain-text position on the outputted paper on the receiver side. However, there is no detailed description or disclosure of the encryption processing on the transmission side in this prior art. Furthermore, since the dot density is ordinarily 8 dots/mm, if the portion where the encryption is initiated is shifted by even one dot in this prior art, the output that resembles noise is obtained. Accordingly, considering the fact that data is read while being scanned in the horizontal direction using paper as the input-output medium, the reading of handwritten designated regions and encrypted portions is extremely difficult; and such a technique is difficult to realize using an ordinary facsimile machine, and therefore the invention may be imperfect. Of course, information transmission techniques which thus use paper as an information medium belong to a different technical field than information transmission techniques for transmitting electronic image data, which is the object of the present invention. For example, in the case of color image data, one dot is expressed by 24 bits combining colors of R, G and B (red, green and blue).

Furthermore, U.S. Pat. No. 5,504,818, "Information Processing System Using Error-Correcting Cryptographs and Cryptography" and Japanese Patent Application No. H3-215909 "Intellectual Information Processing Method and Device" are known prior art, which disclose inventions created by the inventor of the present application. In these prior arts, portions of images or drawings are extracted as rectangles, these portions are filled by blanks, the extracted portions are encrypted, and the encrypted portions are stored in items linked to the original items. In this method, linked files are necessary for the encrypted data.

SUMMARY OF THE INVENTION

The image data encryption device according to the present invention is characterized by the fact that the image data device includes the following means: a memory means which is connected to a display and a peripheral device; an image data display means which is connected to the memory means and displays image data on the display; a partial image data selection means which is connected to the memory means and designates or selects an arbitrary portion of the image data; and an encryption means which is connected to the memory means so that the encryption means encrypts the selected portion of the image data and embeds this encrypted portion in the selected portion of the image data.

Furthermore, the image data encryption method according to the present invention is characterized by the fact that the method includes the following steps: a step in which image data is displayed on a display; a step in which an arbitrary portion of the image data is designated or selected; a step in which the thus selected portion of the image data is encrypted; and a step in which the thus encrypted portion of the image data is embedded in the selected portion of the image data.

In addition, the image data encryption method of the present invention is characterized by the fact that the method comprises the following steps: a step in which image data is displayed on a display; a step in which an arbitrary portion of the image data is designated or selected; a step in which the thus selected portion of the image data is blanked out or colored, and then encrypted; and a step in which the thus encrypted portion of the image data is inserted into a file of the image data.

As seen from the above, in the present invention, image data is extracted, and this portion of the image data is encrypted and then embedded back in the original portion of the data. Alternatively, the extracted portion of the image data is blanked out or colored, and then data obtained by encrypting this portion is stored in the same file.

DETAILED DESCRIPTION OF THE PREFERRED EMBODIMENTS

Below, the present invention will be described in detail with reference to the drawings that illustrate an embodiment of the present invention.

The present invention can be applied to all types of images or graphic images such as still images, movie images and images contained in electronic documents such as home pages, word processing documents and e-mail, etc. The present invention can further be applied to industrial images, etc. Also, any type of encryption techniques may be employed.

The following embodiment is merely one concrete example of the present invention and does not limit the technical scope of the present invention.

Figure 1:
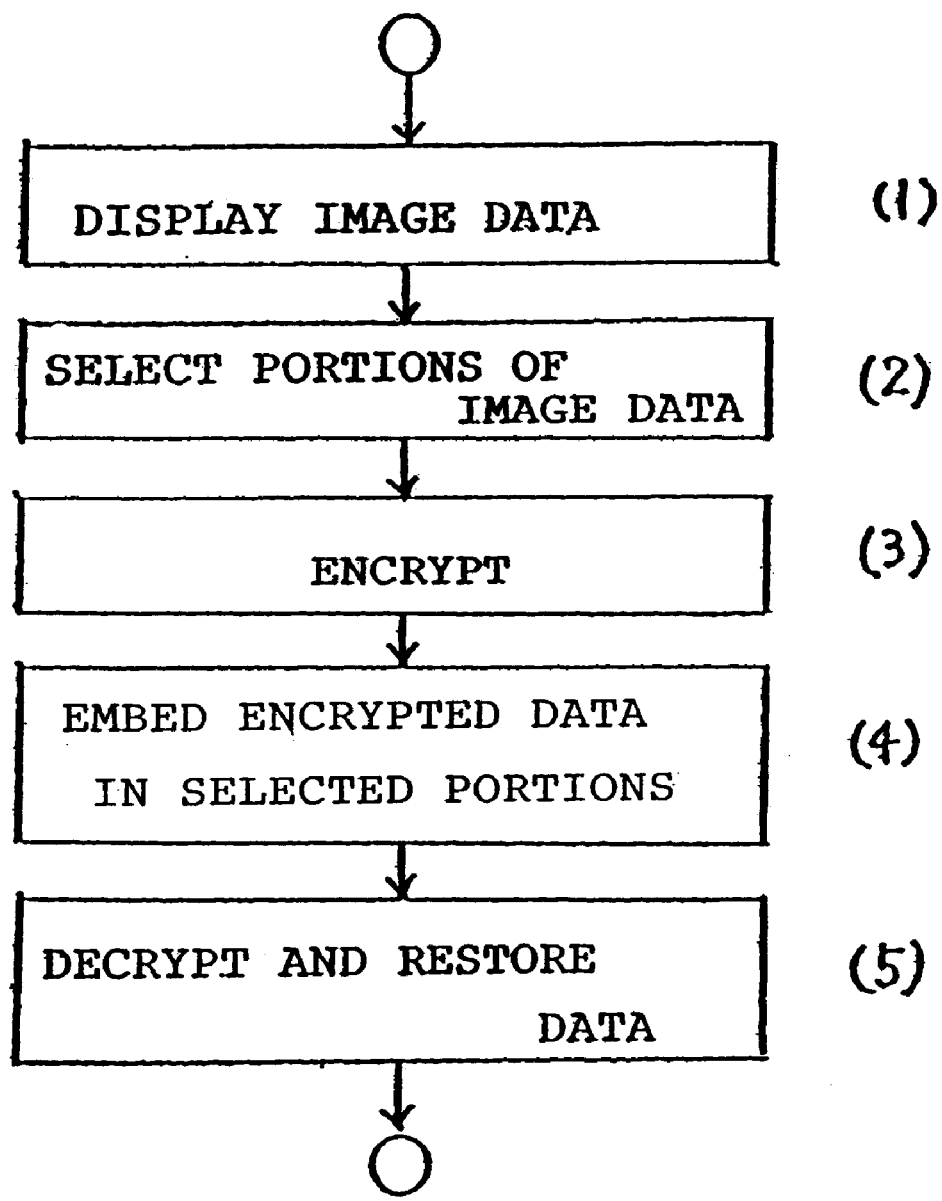
FIG. 1 is a flow chart of the operation of the basic encryption method according to the present invention.
Figure 2:
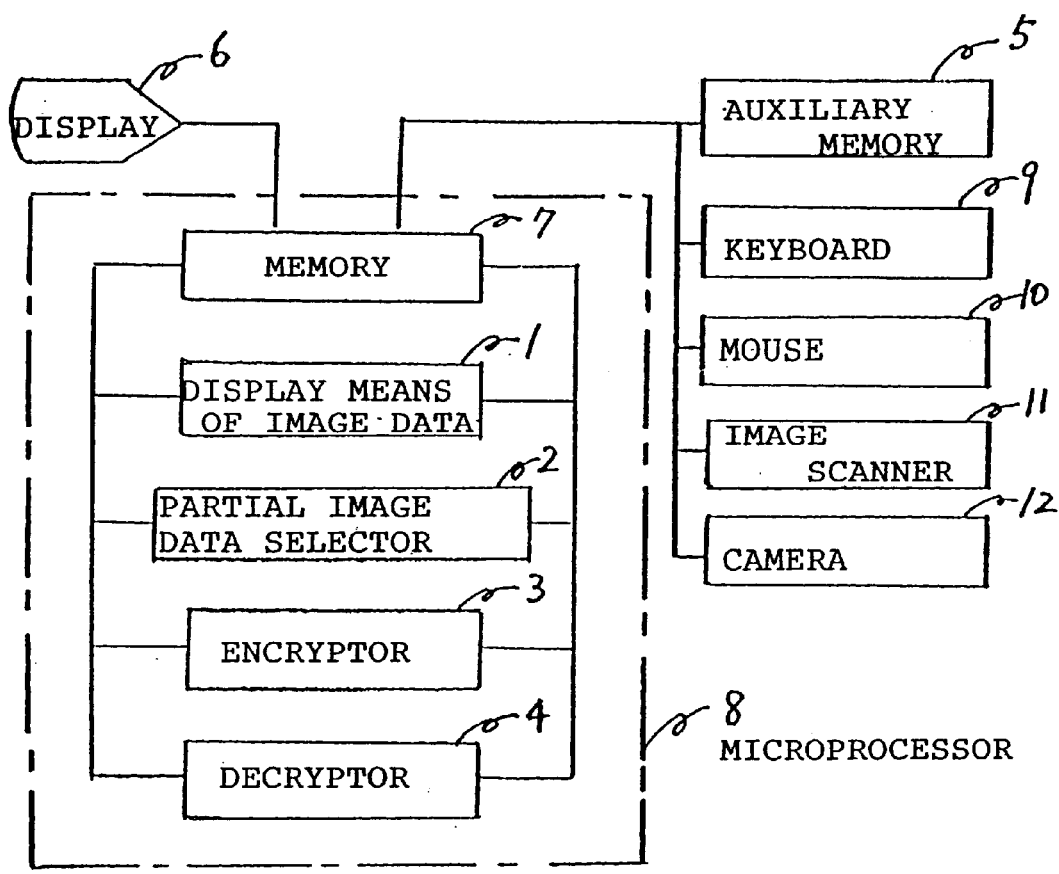
FIG. 2 is a block diagram of the basic encryption device according to the present invention.

FIG. 1 illustrates the basic image encryption method, and FIG. 2 shows the image encryption device.

First in FIG. 2, image data from an image file on an auxiliary (or external) memory 5 such as a hard disk, floppy disk, etc. or image data from an image scanner 11, camera 12, etc. is inputted into a control section 8 by way of, for example, the keyboard 9. The control section 8 is a microprocessor and performs data processing according to the control program written into a memory 7. Below, the description will be made along with FIG. 1 by envisioning hypothetical blocks that have these processing functions. Numerals in parentheses in FIG. 1 are the numbers of the procedures or steps.

More specifically, the image data is read in and displayed on the display 6 by an image data display means 1 (step 1). On the display 6, an arbitrary portion (or portions) of the image, which is to be encrypted, is selected by partial image data selector 2 which uses, for example, a mouse 10, etc. (step 2). The portion(s) to be encrypted is selected as, for example, a rectangle; and the diagonal coordinates of this rectangle may be accommodated at the tail end of the original image. Next, the selected portion(s) of the image data is encrypted by an encryptor (or encrypting means) 3 (step 3) and is embedded in the selected portion(s) of the original image data (step 4). One method to accomplish the partial encryption easily is to temporarily save the selected portion in a separate file, to entirely encypt this file, and then to embed the thus encrypted data of the file back into the original image data.

Ordinarily, the encrypted data is sent to a correspondent (or receiving party), and the correspondent extracts and decrypts the encrypted portion(s) using a decryptor (or decrypting means) 4 and returns the decrypted portion to its original state (step 5). Of course, encrypted and stored data may also be decrypted by the encrypting party himself. When decrypting the data encrypted by the present invention, the diagonal coordinates stored at the tail end of the image, for example, are utilized.

Figure 3:
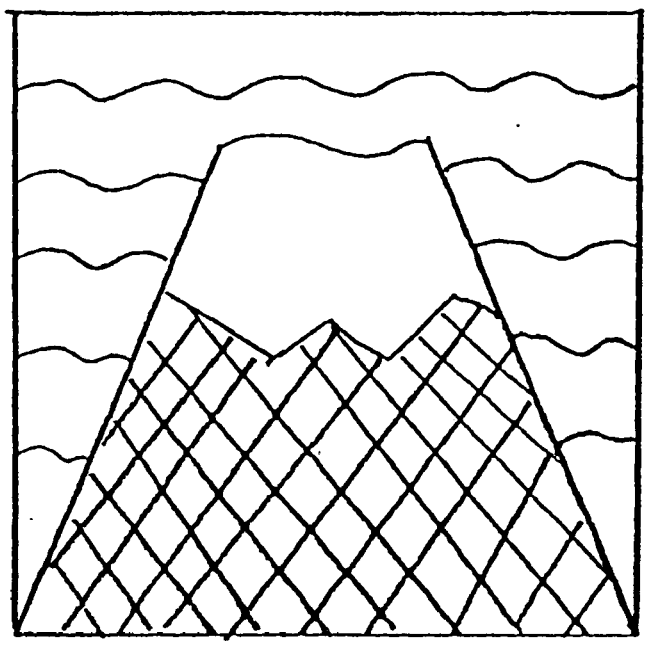
FIGS. 3(a) and 3(b)) show one example of partial encryption of an image according to the present invention.
Figure 3:
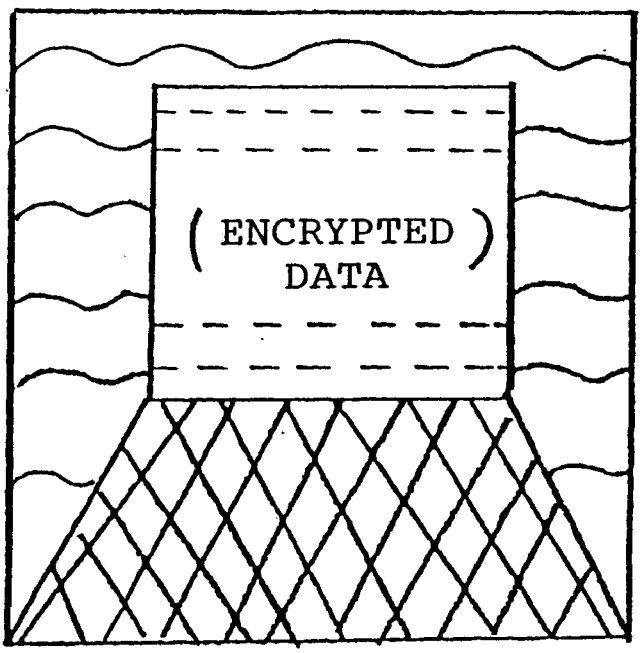

FIG. 3(a) shows an example of original image data, and FIG. 3(b) shows an example of image data in which partially encrypted data is embedded.

In the above, the partial image data selector 2 may use a method such as selection of the rectangle to be encrypted simply by inputting the diagonal coordinate values, etc.

The above-described partial encryption processing may also be performed in a state in which the image is displayed on the image encryption device. Moreover, the encryption/decryption processing can be performed with the image data stored in an auxiliary memory such as a hard disk, floppy disk, etc., or while the image data is being copied to a new file.

Furthermore, data such as the diagonal coordinates indicating the encrypted portion(s), etc. can be recorded in the original image file, e.g., in an unused portion of the header of the original image or at the tail end of the image data. By way of this, it is not necessary to append the data required for encryption/decryption in a separate file. Of course, the diagonal coordinates, encryption key and security labels using different encryption keys, etc. may also be appended in a separate file.

The present invention can also be applicable in cases where the encrypted portion is a horizontal open shape portion (an area continuous in line direction) displayed conventionally as a blank or in cases where there is less than one line of data above and below a horizontal open shape portion which is continuous in the memory. Furthermore, though the programming is complicated, encrypted portion (s) with complicated shapes such as round, diamond-shaped, etc. can be designated.

For example, a circular area can be selected by encrypting when the equation:

$$(x-X)^2|(y-Y)^2 \leq R^2$$

is satisfied, wherein x and y are the coordinates of a certain point, X and Y are the center coordinates and R is the radius.

When the selected image data and the encrypted data have the same size, the encrypted data can be snugly embedded in the original image. It is easy to accomplish this. For example, in the case of a DES cipher, it is only necessary to encrypt an integral multiple of the encryption unit (8 bytes) as the selected image. However, if the encrypted data is larger than the selected image data, a part of the original image will drop out. However, even if such a drop-out occurs, the present invention is effective as long as there is no actual loss of the image. This can also be accomplished in the case of an RSA cipher.

Furthermore, a high-level system can be constructed by installing a plurality of security levels using different encryption keys for the encrypted portion(s) and using corresponding encryption keys/decryption keys.

Moreover, it is also effective to use a method in which image data is extracted, the extracted portion(s) is blanked out or colored, and the data encrypting this portion(s) is inserted into the same file. In this case, a plurality of security levels can be displayed by the colors used for this coloring.

Figure 4:
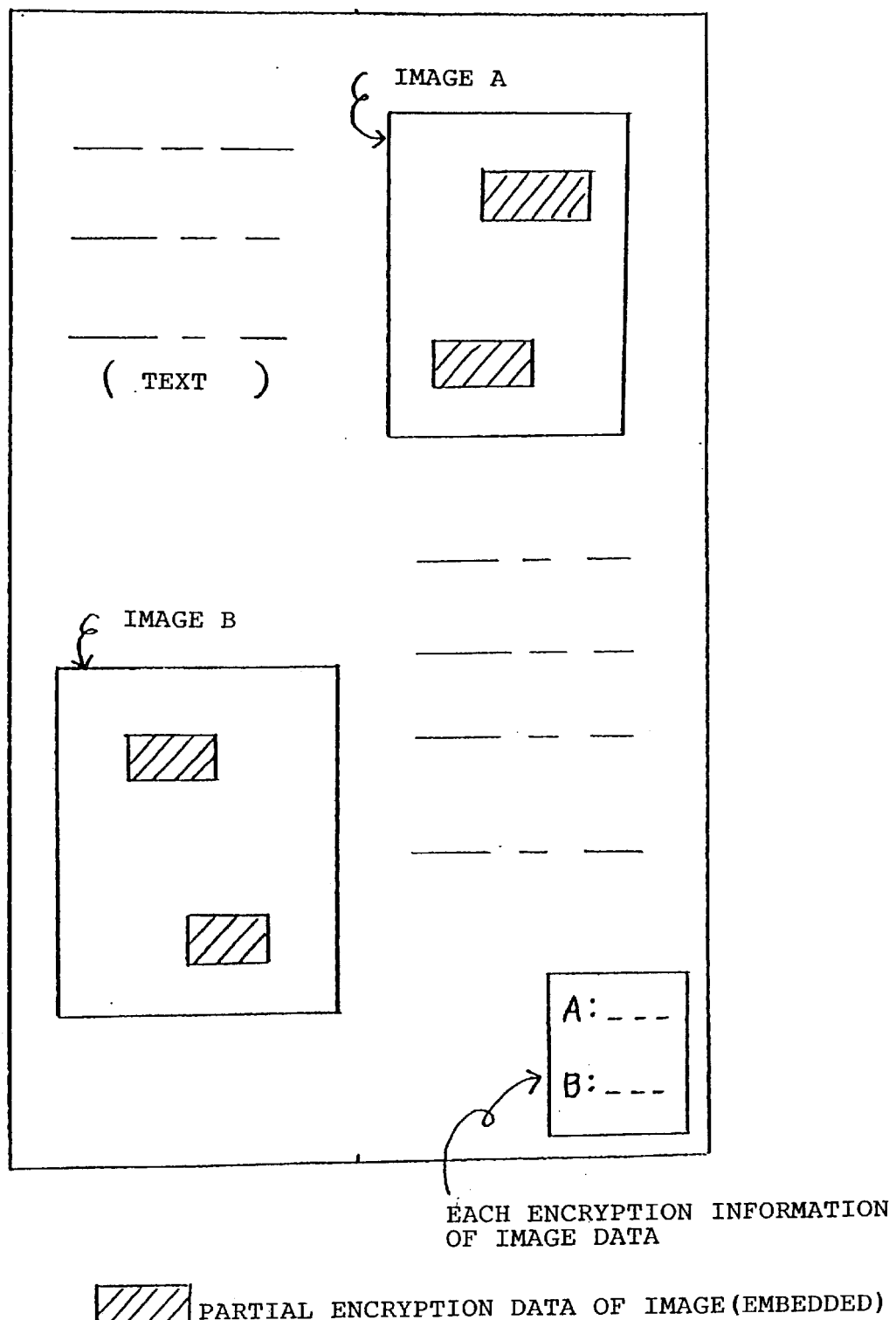
FIG. 4 shows one example of partial encryption of respective images in an electronic document containing images.

FIG. 4 shows an example of partial encryption of respective images in an electronic document containing images.

In the case of partial encryption of one or more sets of image data mixed with text data, etc., encryption/decryption processing is performed with encryption key (indirect) information, security levels and security information such as positional information for the partially encrypted data of the respective images (encryption information for the respective sets of image data) accommodated in the same electronic document. Furthermore, this security information may be accommodated in a file linked to the same electronic document. Alternatively, the respective sets of security information for the respective images may be accommodated within the respective images, e.g., in the header portions of the respective images or at the tail ends of the respective images, etc. Furthermore, the respective sets of partially encrypted data may be embedded in the original data portions; and a method in which the image data is extracted, the extracted portion(s) are blanked out or colored, and the data encrypting these portions is inserted into the same file or a linked file, etc., can be employed.

As seen from the above, according to the present invention, since the partially encrypted data of an image is embedded in the original image, there is no need for a special memory region or file to accommodate the encrypted data.

What is claimed is:

1. An image data encryption device comprising:
  a memory means connected to a display and peripheral devices;

an image data display means connected to said memory means for displaying one or more sets of image data;

a partial image data selection means connected to said memory means for storing diagonal coordinates of each of rectangles so as to select one or more arbitrary portions of each of said sets of image data as said rectangles; and an encryption means connected to said memory means for encrypting each of said selected portions using said diagonal coordinates and for embedding each of said encrypted portions in each of said selected portions of each of said sets of image data; and wherein further comprising said encryption means connected to said memory means for embedding each of said encrypted portions in each of said selected portions of each of said sets of image data using one of values of said diagonal coordinates and storing said diagonal coordinates of each of said embedded encrypted portions in cases where said encrypted portions are larger than said selected portions and said one value of said diagonal coordinates of each of said selected portions is equal to said one value of said diagonal coordinates of each of said embedded encrypted portions.

2. The image data encryption device according to claim 1, wherein one or more of said sets of image data are contained in an electronic document.

3. The image data encryption device according to claim 1, further comprising said partial image data selection means connected to said memory means for storing values of said diagonal coordinates of said rectangles using a mouse, not requiring drawing said rectangles.

4. The image data encryption device according to claim 1, further comprising said partial image data selection means connected to said memory means for storing values of said diagonal coordinates of said rectangles simply by inputting said values, not requiring drawing said rectangles.

5. The image data encryption device according to claim 1, further comprising said partial image data selection means connected to said memory means for storing values of said diagonal coordinates in unused portions of headers of said image data.

6. The image data encryption device according to claim 1, further comprising said partial image data selection means connected to said memory means for storing values of said diagonal coordinates in the same file as said image data or in a separate file.

7. The image data encryption device according to claim 1, wherein said device stores values of said diagonal coordinates, encryption key information and security information in the same file as said image data or in a separate file.

8. The image data encryption device according to claim 1, further comprising a decryption means connected to said memory means for decrypting each of said encrypted portions using said diagonal coordinates and for returning each of said decrypted portions to each of original states thereof.

9. The image data encryption device according to claim 1, further comprising a decryption means connected to said memory means for decrypting each of said encrypted portions using said diagonal coordinates of each of said embedded encrypted portions and for returning each of said decrypted portions to each of original states thereof using said diagonal coordinates of each of said selected potions in cases where said encrypted portions are larger than said decrypted portions.

* * * * *